US010962822B2

(12) United States Patent
Smith et al.

(10) Patent No.: US 10,962,822 B2
(45) Date of Patent: Mar. 30, 2021

(54) LIQUID-CRYSTAL SELECTABLE BANDPASS FILTER

(71) Applicant: VIAVI Solutions Inc., San Jose, CA (US)

(72) Inventors: Valton Smith, Daly City, CA (US); William D. Houck, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/001,851

(22) Filed: Jun. 6, 2018

(65) Prior Publication Data

US 2019/0377222 A1  Dec. 12, 2019

(51) Int. Cl.
| | | |
|---|---|---|
| *G02F 1/1335* | (2006.01) | |
| *G02F 1/133* | (2006.01) | |
| *G02F 1/137* | (2006.01) | |
| G02B 5/00 | (2006.01) | |
| G02B 5/28 | (2006.01) | |
| F21V 8/00 | (2006.01) | |
| G02B 6/293 | (2006.01) | |

(52) U.S. Cl.
CPC ........ *G02F 1/133514* (2013.01); *G02F 1/137* (2013.01); *G02F 1/13318* (2013.01); *G02F 1/133526* (2013.01); G02B 5/003 (2013.01); G02B 5/28 (2013.01); G02B 6/0026 (2013.01); G02B 6/2938 (2013.01); G02B 6/29389 (2013.01); G02F 2001/133521 (2013.01); G02F 2203/055 (2013.01); G02F 2203/58 (2013.01)

(58) Field of Classification Search
CPC ........... G02F 1/133514; G02F 1/13318; G02F 1/133526; G02F 1/137; G02F 2203/055; G02F 2203/58
See application file for complete search history.

(56) References Cited

U.S. PATENT DOCUMENTS

| | | | | |
|---|---|---|---|---|
| 5,808,712 A | * | 9/1998 | Hishida | G02F 1/133526 349/138 |
| 6,072,445 A | | 6/2000 | Spitzer et al. | |
| 9,218,684 B2 | * | 12/2015 | Tsuzaki | G06T 15/00 |
| 9,354,449 B2 | * | 5/2016 | Miyazawa | G02B 30/27 |
| 2003/0122956 A1 | * | 7/2003 | Sugimoto | H04N 5/235 348/362 |
| 2010/0165134 A1 | * | 7/2010 | Dowski, Jr. | B24B 13/06 348/218.1 |

(Continued)

OTHER PUBLICATIONS

Jon Y. Hardeberg, Francis Schmitt, Hans Brettel; "Multispectral color image capture using a liquid crystal tunable filter"; Opt. Eng. 41(10) 2532-2548 (Oct. 2002).*

(Continued)

*Primary Examiner* — Hoan C Nguyen
(74) *Attorney, Agent, or Firm* — Harrity & Harrity, LLP (57) ABSTRACT

An optical device may include an optical filter array comprising an array of bandpass filters, and a liquid-crystal (LC) panel comprising an array of LC regions. An aspect ratio of the LC panel may match an aspect ratio of the optical filter array such that each LC region, of the array of LC regions, is associated with a respective bandpass filter of the array of bandpass filters A LC region, of the array of LC regions, may selectively transmit light that is incident on the LC region.

20 Claims, 5 Drawing Sheets

(56) References Cited

U.S. PATENT DOCUMENTS

| | | | |
|---|---|---|---|
| 2011/0069254 A1* | 3/2011 | Takama | G02B 3/14 |
| | | | 349/62 |
| 2015/0200220 A1* | 7/2015 | Juenger | H01L 27/14621 |
| | | | 257/432 |
| 2015/0248038 A1* | 9/2015 | Zhang | G02F 1/133514 |
| | | | 257/390 |
| 2016/0123811 A1* | 5/2016 | Hegyi | G01J 3/0256 |
| | | | 348/33 |
| 2017/0090247 A1* | 3/2017 | Lee | G02F 1/133617 |
| 2017/0102588 A1* | 4/2017 | Im | G02F 1/133514 |
| 2018/0234644 A1* | 8/2018 | Li | H04N 5/332 |

OTHER PUBLICATIONS

Thorlabs, "Liquid Crystal Tunable Bandpass Filters", https://www.thorlabs.com/newgrouppage9.cfm?objectgroup_ID=3488, 2018, 3 pages.

Viavi, "From Image Sensors to Spectral Sensors Technology Fusion to Enable a Smarter World", http://www.image-sensors.com/ImageSensors/media/Image-Sensors-2016/Viavi-Sensors-Whitepaper.pdf, 2017, 3 pages.

Chen H., et al., "Recent Advances on Quantum-Dot-Enhanced Liquid-Crystal Displays," IEEE Journal of Selected Topics in Quantum Electronics, Sep. 1, 2017, vol. 23 (5), pp. 1-11, XP055630555.

Extended European Search Report for Application No. EP19177546.9, dated Nov. 13, 2019, 9 pages.

* cited by examiner

LIQUID-CRYSTAL SELECTABLE BANDPASS FILTER

BACKGROUND

An optical filter is a device that transmits light, incident on the optical filter, based on wavelength. For example, a bandpass optical filter (herein referred to as a bandpass filter) transmits light in a particular range of wavelengths while absorbing light at wavelengths that fall outside of (i.e., above or below) the particular range of wavelengths.

SUMMARY

According to some possible implementations, an optical device may include: an optical filter array comprising an array of bandpass filters; and a liquid-crystal (LC) panel comprising an array of LC regions, wherein an aspect ratio of the LC panel matches an aspect ratio of the optical filter array such that each LC region, of the array of LC regions, is associated with a respective bandpass filter of the array of bandpass filters, and wherein a LC region, of the array of LC regions, is to selectively transmit light that is incident on the LC region.

According to some possible implementations, an optical device may include: an array of optical filters; and a liquid-crystal (LC) panel comprising an array of LC regions, wherein a first LC region, of the array of LC regions, is to selectively transmit light that is incident on the first LC region, wherein the first LC region is associated with a first optical filter of the array of optical filters, and wherein a second LC region, of the array of LC regions, is to selectively transmit light that is incident on the second LC region, wherein the second LC region is associated with a second optical filter of the array of optical filters.

According to some possible implementations, a method may include: filtering, by a bandpass filter included in an optical filter array of an optical device, light that is incident on the bandpass filter, and selectively transmitting, by a liquid-crystal (LC) region included in a LC panel of the optical device, light that is incident on the LC region, wherein an aspect ratio of the LC panel matches an aspect ratio of the optical filter array such that each LC region, of the LC panel, is associated with a respective bandpass filter of the optical filter array.

DETAILED DESCRIPTION

The following detailed description of example implementations refers to the accompanying drawings. The same reference numbers in different drawings may identify the same or similar elements.

An optical filter array may include a set of optical filters designed to transmit light in different wavelength ranges. For example, the optical filter array may include a group of discrete bandpass filters, each of which may be designed to transmit light in a respective wavelength range. Such an optical filter array may be referred to as a multispectral filter array. As another example, the optical filter array may include one or more optical filters, where a wavelength range transmitted by a given optical filter may be electrically controlled (e.g., such that the wavelength range transmitted by the given optical filter is dependent on an electrical signal applied to the given optical filter).

The optical filter array may be included in an optical device, such as a multispectral sensor device that can be used to capture spectral data relating to different wavelengths of light (based on wavelengths of light transmitted by the optical filter array). In operation, the multispectral sensor device may need to select a wavelength for which spectral data is to be collected. As such, in operation, the multispectral sensor device may need to switch from collecting spectral data associated with light in a first wavelength range (e.g., light transmitted by a first optical filter, light transmitted by a particular optical filter based on a first electrical signal being applied to the particular optical filter) to collecting spectral data associated with light in a second wavelength range (e.g., light transmitted by a second optical filter or light transmitted by the particular optical filter based on a second electrical signal being applied to the particular optical filter).

A speed at which optical filter switching can be performed (e.g., a speed at which the optical device switches between utilizing different optical filters) and an operable wavelength range are important performance considerations for such an optical device. Generally, it may be desirable to achieve a highest possible optical filtering switching speed and a highest possible operable wavelength range, while limiting complexity and/or cost of the optical device.

Some implementations described herein a liquid crystal (LC) selectable bandpass filter that enables rapid optical filter switching with no moving parts, where optical filter switching is controlled electronically. In some implementations, the LC selectable bandpass filter may include an optical filter array and a LC panel, as described in further detail below.

In some implementations, the LC selectable bandpass filter permits a multispectral sensor device to use a single photodiode for collecting multispectral data. In some implementations, the use of a single photodiode reduces complexity and/or cost of the multispectral sensor (e.g., as compared to a multispectral sensor device including a one-dimensional (1D) or two-dimensional (2D) array of photodiodes), while also improving performance of the multispectral sensor device, as described below. Further, in some implementations, the LC selectable bandpass filter may allow for higher spectral resolution measurements when a 1D or 2D array of photodiodes is used, as described below.

Figure 1:
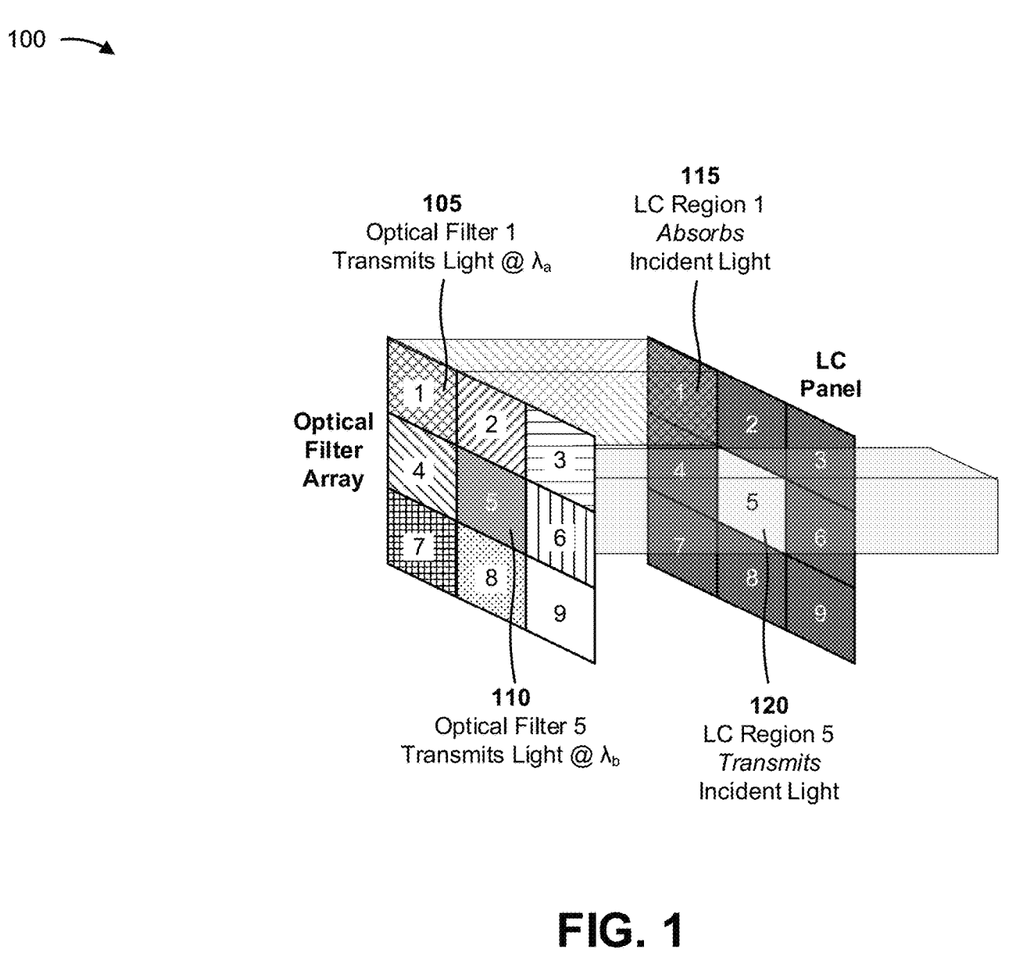
FIG. 1 is a diagram of an overview of an example implementation described herein.

FIG. 1 a diagram of an overview of an example implementation 100 associated with a LC selectable bandpass filter. As shown in FIG. 1, a LC selectable bandpass filter may include an optical filter array and a LC panel.

As shown in FIG. 1, the optical filter array includes an array of bandpass filters (e.g., filter 1 through filter 9), each of which may be configured to transmit a light in a respective wavelength range. As further shown, the LC selectable bandpass filter may include a LC panel comprising an array of LC regions (e.g., LC region 1 through LC region 9). As shown, an aspect ratio of the LC panel may match an aspect ratio of the optical filter array such that each LC region, of the array of LC regions, is associated with a respective bandpass filter of the array of bandpass filters.

In operation, a given LC region, of the array of LC regions, may selectively transmit light that is incident on the given LC region (e.g., based on whether an electrical signal is applied to the given LC region). For example, during operation using the arrangement shown in FIG. 1, a beam of light is incident on the optical filter array (a left side of the optical filter array), and each bandpass filter transmits light in a different wavelength range. For example, as indicated by reference number 105, filter 1 transmits a portion of the beam of light, incident on filter 1, that is in wavelength range $\lambda_a$. Similarly, as indicated by reference number 110, filter 5 transmits a portion of the beam of light, incident on filter 5, that is in wavelength range $\lambda_b$. Although not shown, other bandpass filters similarly transmit light in respective wavelength ranges.

As shown by reference number 115, the light (in wavelength range $\lambda_a$) transmitted by filter 1 is incident on LC region 1. Here, as shown, LC region 1 is operating in a blocking state such the LC region 1 absorbs the light transmitted by filter 1 (i.e., such that LC region 1 prevents the light from passing through the LC panel). In some implementations, LC region 1 may operate in the blocking state when an electrical signal is applied to LC region 1.

Conversely, as shown by reference number 120, the light (in wavelength range $\lambda_b$) transmitted by filter 5 is incident on LC region 5. Here, as shown, LC region 5 is operating in a transmitting state such the LC region 5 transmits the light transmitted by filter 5 (i.e., such that LC region 5 allows the light to pass through the LC panel). In some implementations, LC region 5 may operate in the transmitting state when no electrical signal is applied to LC region 5.

In the case of a multispectral sensor device, the light transmitted by filter 5 may be directed to a photodiode, or an array of photodiodes, such that spectral data, associated with wavelength range $\lambda_b$, can be collected. Here, when optical filter switching needs to be performed in order to allow spectral data associated with another wavelength range to be collected, electrical signals are differently applied. For example, when spectral data associated with wavelength range $\lambda_a$ is to be collected, the multispectral sensor device may stop applying an electrical signal to LC region 1 (e.g., in order to cause LC region 1 to operate in the transmitting state rather than the blocking state), and may start applying an electrical signal to LC region 5 (e.g., in order to cause LC region 5 to operate in the blocking state rather than the transmitting state). In this way, the LC selectable bandpass filter enables rapid optical filter switching without requiring any moving parts, and optical filter switching is controlled electronically.

As indicated above, FIG. 1 is provided merely as an example. Other examples are possible and may differ from what was described with regard to FIG. 1. For example, while FIG. 1 describes light as being filtered by the optical filter array before being selectively transmitted by the LC panel (e.g., such that light propagates from left to right in FIG. 1), in some implementations, light may be selectively transmitted by the LC panel before being filtered by the optical filter array (e.g., such that light propagates from right to left in FIG. 1).

Figure 2A:
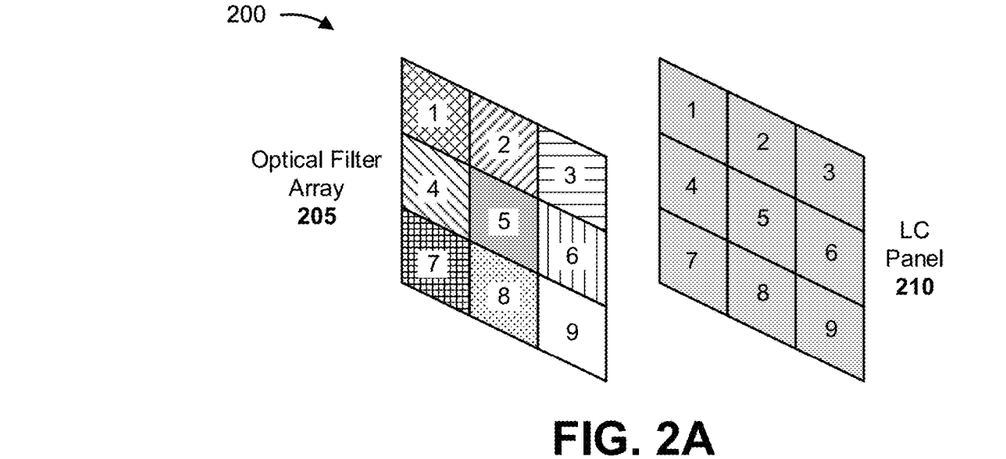
FIG. 2A is a diagram of example components of a liquid-crystal (LC) selectable bandpass filter.

FIG. 2A is a diagram of example components of a LC selectable bandpass filter 200. As shown in FIG. 2A, LC selectable bandpass filter 200 may include an optical filter array 205 and a LC panel 210. In some implementations, LC selectable bandpass filter 200 may be included in a multi-spectral sensor device that can be used to collect spectral data relating to different wavelengths of light, as described herein. Generally, LC selectable bandpass filter 200 can be included in any type of optical device in order to provide selectable optical filtering.

Optical filter array 205 includes an array of optical filters. For example, optical filter array 205 may include a multi-spectral filter array that includes a group of discrete bandpass filters, each configured to transmit light in a respective wavelength range and reflect and/or absorb light outside of the respective wavelength range. In the example shown in FIG. 2A, optical filter array 205 includes a 3×3 multispectral filter array comprising nine discrete bandpass filters, where each of the nine discrete bandpass filters is configured to transmit light in a different wavelength range. In some implementations, optical filter array 205 may include any number of discrete bandpass filters (e.g., two bandpass filters, 36 bandpass filters, 64 bandpass filters, 128 bandpass filters, or more). In some implementations, a size (e.g., a width, a height, and/or the like) of a given bandpass filter of optical filter array 205 may be in a range from approximately 20 microns (μm) to approximately 200 μm. In some implementations, the bandpass filters of optical filter array 205 may be have a square shape, a rectangular shape, or another of shape. In some implementations, a thickness of optical filter array 205 may be in a range from approximately 150 microns (μm) to approximately 650 μm.

LC panel 210 includes a panel of LC regions capable of selectively transmitting light incident thereon. In some implementations, a given LC region selectively transmits light based on whether an electrical signal is applied to the given LC region.

As shown in FIG. 2A, in some implementations, an aspect ratio of LC panel 210 may match an aspect ratio of optical filter array 205 such that each LC region of LC panel 210 is associated with a respective bandpass filter of optical filter array 205. For example, as shown in FIG. 2A the aspect ratio of optical filter array 205 may match that of LC panel 210 such that filter 1 is associated with LC region 1 (e.g., such that light transmitted by filter 1 is incident on LC region 1 or such that light transmitted by LC region 1 is incident on filter 1, depending on a direction of propagation of light), such that filter 2 is associated with LC region 2 (e.g., such that light transmitted by filter 2 is incident on LC region 2 or such that light transmitted by LC region 2 is incident on filter 2, depending on a direction of propagation of light), and so on. In some implementations, LC panel 210 may be of similar size to optical filter array 205 or may be differently sized than optical filter array 205.

Figure 2B:
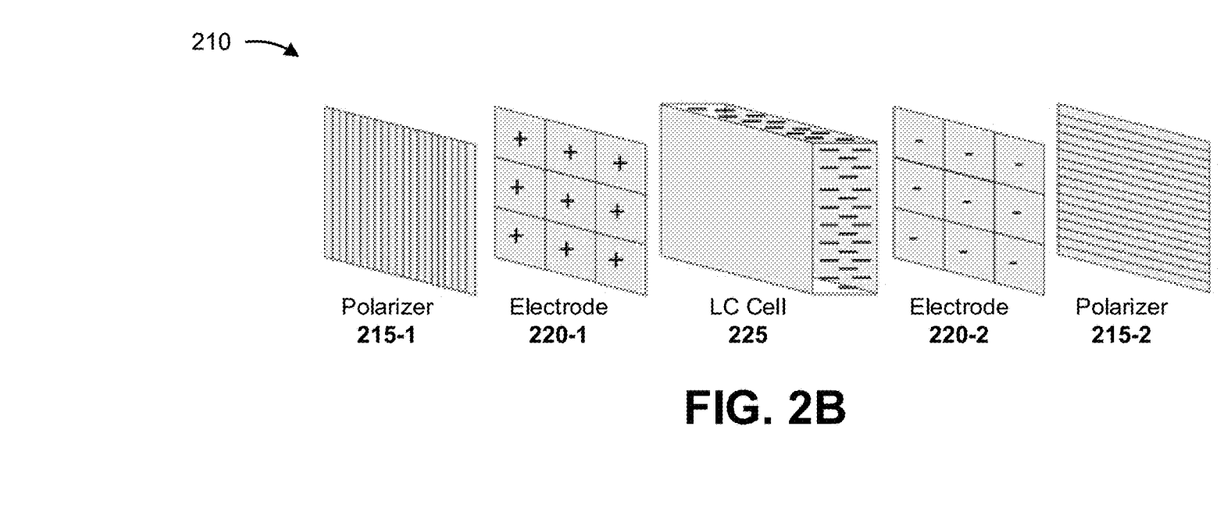
FIG. 2B is a diagram of example components of the LC panel included in the LC selectable bandpass filter of FIG. 2A.

FIG. 2B is a diagram of example components of LC panel 210. As shown in FIG. 2B, LC panel 210 may include a set of polarizers 215 (e.g., polarizers 215-1 and 215-2), a set of electrodes 220 (e.g., electrode 220-1 and electrode 220-2), and a LC cell 225. As shown, LC cell 225 may be arranged between the set of electrodes 220, and LC cell 225 and the set of electrodes 220 are arranged between the set of polarizers 215. Notably, while LC panel 210 is described herein as a twisted-nematic (TN) LC panel, LC panel 210 may be another type of LC panel, such as a vertical alignment (VA) LC panel, an in-plane switching (IPS) LC panel, and/or the like. The type of LC panel used in LC selectable bandpass filter 200 may be selected based on attributes of the different types of LC panels. For example, a TN LC panel may provide faster switching rates than other types of LC panels, whereas a VA LC panel may provide better contrast between blocking and transmitting states.

As shown in FIG. 2B, the set of polarizers 215 may be oriented such that a polarization of polarizer 215-1 differs from (e.g., is perpendicular to) a polarization of polarizer 215-2. For example, in FIG. 2B, polarizer 215-1 is oriented to pass light that is polarized in a vertical direction, while polarizer 215-2 is oriented to pass light that is polarized in a horizontal direction. In some implementations, such an orientation of polarizers 215 allows light to be selectively transmitted by LC panel 210, as described below.

As further shown in FIG. 2B, each of the set of electrodes 220 may comprise a group of electrode regions, each of which corresponds to a respective LC region of LC panel 210. Thus, the electrode regions may define the LC regions of LC panel 210. In some implementations, an electrical signal can be applied to electrode regions associated with a given LC region (e.g., by applying a positive voltage to a corresponding region on electrode 220-1 and a negative voltage to a corresponding region of electrode 220-2) in association with selectively transmission of light by the given LC region, as described below.

LC cell 225 includes a cell of liquid crystals. In some implementations, LC cell 225 may be structured so that a neutral state of a LC molecules of LC cell 225 is arranged in a heliacal form. In some implementations, LC molecules, associated with a given LC region, may be rearranged (e.g., to a non-helical form) based on an electrical signal being applied to electrode regions associated with the given LC region. In some implementations, this arrangement/rearrangement of LC molecules of LC cell 225 may be used to selectively rotate a polarization of light passing through LC cell 225 in association with selective transmission of light by a given LC region, as described below.

In some implementations, a given LC region of LC panel 210 may selectively transmit light based on whether an electrical signal is applied to electrodes 220 associated with the given LC region. For example, in operation, vertically polarized light may enter LC panel 210 through polarizer 215-1. Here, when no electrical signal is applied to a particular LC region, a portion of the light that propagates through a corresponding portion of LC cell 225 interacts with LC molecules of LC cell 225 (arranged in a helical arrangement), which causes the portion of the light to rotate to a horizontal polarization (e.g., a 90° rotation). Thus, when exiting LC cell 225, the portion of light has the horizontal polarization. Here, the since the horizontal polarization of the portion of the light matches the polarization of polarizer 215-2, the portion of the light is transmitted by polarizer 215-2.

Conversely, when an electrical signal (e.g., a voltage signal) is applied to a particular LC region, a portion of the light that propagates through a corresponding portion of LC cell 225 does not significantly interact with LC molecules of LC cell 225 (e.g., when the LC molecules are rearranged such that the LC molecules are aligned with the electric field), which causes the portion of the light to substantially maintain the vertical polarization. Thus, when exiting LC cell 225, the portion of light has the vertical polarization. Here, the since the vertical polarization of the portion of the light is perpendicular to the polarization of polarizer 215-2, the portion of the light is blocked (i.e., absorbed, not transmitted) by polarizer 215-2.

In some implementations, each LC region of LC panel 210 may be independently controlled such that light can be selectively transmitted by a given LC region of LC panel 210 regardless of whether light is being transmitted by another LC region of LC panel 210.

The number and arrangement of components shown in FIGS. 2A and 2B are provided as example. In practice, there may be additional components, fewer components, different components, or differently arranged components than those shown in FIGS. 2A and 2B. Furthermore, two or more components shown in FIGS. 2A and 2B may be implemented within a single component, or a single component shown in FIGS. 2A and 2B may be implemented as multiple, distributed components.

In some implementations, LC selectable bandpass filter 200 may be included in a multispectral sensor device that includes one or more photodiodes associated with collecting spectral data. In some conventional multispectral sensor devices, spectral data associated with different wavelength ranges is collected using an array of photodiodes (e.g., a 1D array or a 2D array). However, for some photodiodes (e.g., extended indium gallium arsenide (InGaAs) photodiodes), material costs are significant and, as such, an array of photodiodes can become prohibitively expensive. Moreover, as a number of photodiodes in a given array increases, multispectral sensor device complexity also increases (e.g., as compared to a multispectral sensor device including a single photodiode). Further, an array of photodiodes may have a comparatively slower frame-rate and/or a lower bit depth (e.g., as compared to a single photodiode). Thus, by allowing a single photodiode to be used in a multispectral sensor device, cost and/or complexity of the multispectral sensor device may be reduced, while performance of the multispectral sensor device may be improved.

Figure 3:
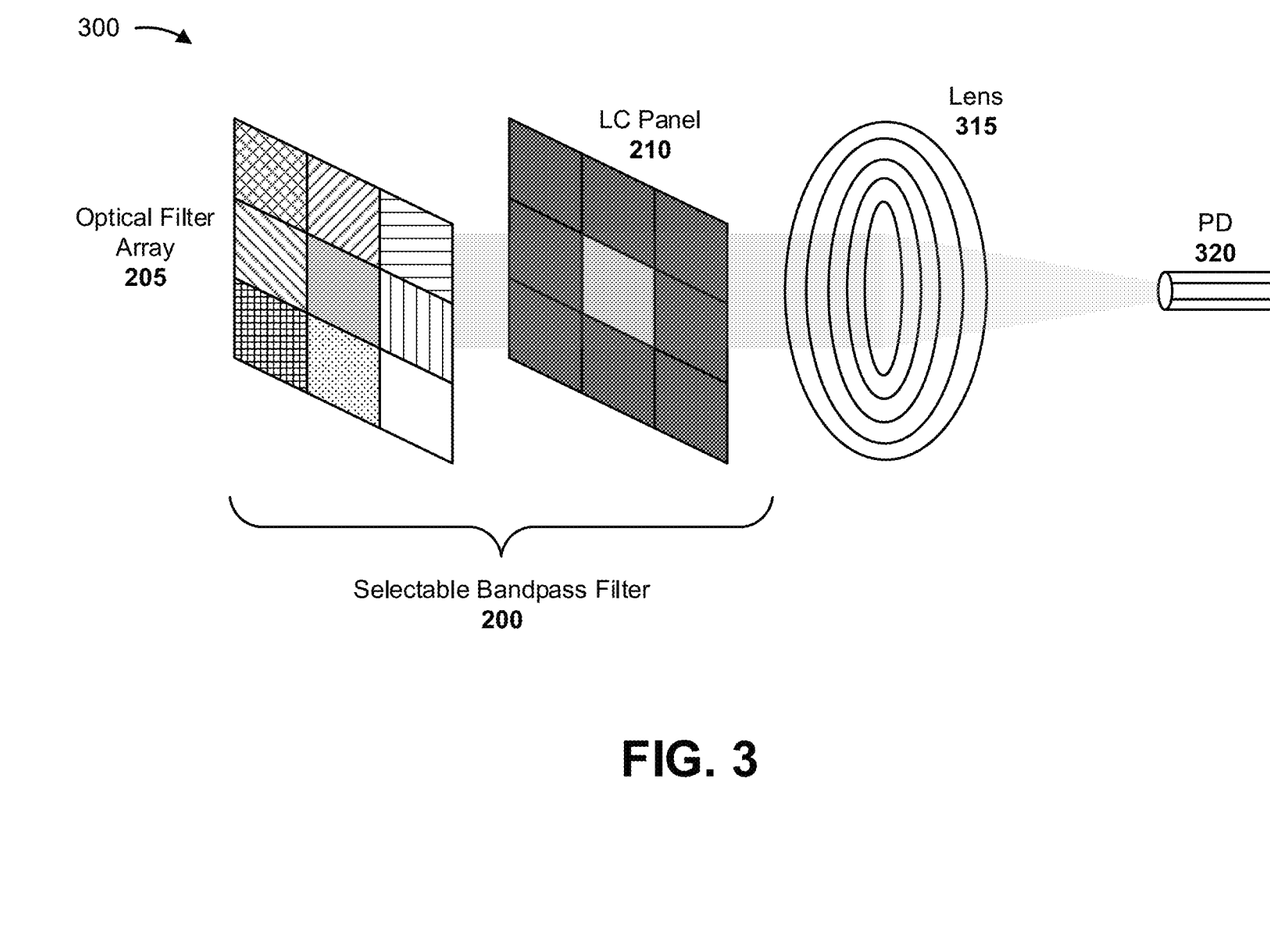
FIG. 3 is a diagram of an example multispectral sensor device including a LC selectable bandpass filter and a single photodiode.

FIG. 3 is a diagram of an example multispectral sensor device 300 including LC selectable bandpass filter 200 and a single photodiode. As shown in FIG. 3, multispectral sensor device 300 may include LC selectable bandpass filter 200, a lens 315, and a photodiode (PD) 320.

Lens 315 is a lens arranged to focus light, transmitted by LC selectable bandpass filter 200, to a set of focal points on a focal plane. For example, lens 315 may include a circular lens, a Fresnel lens, or another type of convex lens capable of focusing light incident thereon. In some implementations, a focal point at which light is focused by lens 315 depends on an angle of incidence of the light on lens 315. As such, lens 315 may convert an angle of incidence of a given portion of light, incident on lens 315, to a point in space (e.g., a point on the focal plane). Put another way, the Fourier Transform property of lens 315 causes lens 315 to map incident angle to a point on the focal plane. The focal point to which light is focused does not depend on a filter of optical filter array 205 or a LC region of LC panel 210 that transmitted the light. Thus, light incident on lens 315 at a particular angle (e.g., normal incidence) after transmission by a first filter and associated first LC region will be focused to the same focal point as light incident on lens 315 at the particular angle after transmission by a second filter and associated second LC region. This property of lens 315 allows for a single PD 320 to be used in association with collection of spectral data, an example of which is described below.

PD 320 includes a photodiode that is arranged to receive, via lens 315, light that is transmitted by LC selectable bandpass filter 200. In some implementations, PD 320 may be capable of collecting spectral data based on receiving the light transmitted by LC selectable bandpass filter 200. In some implementations, PD 320 may be arranged at a focal point to which lens 315 is to focus light transmitted by LC selectable bandpass filter 200. For example, PD 320 may be arranged at a focal point to which lens 315 focus light that is incident on lens 315 at normal incidence. In some implementations, PD 320 may be arranged at the focal point associated with normal incidence since optical filter array 205 may be optimized for collimated light at normal incidence. This way, light incident on optical filter array 205 at other angles can be directed away from PD 320.

In operation, light that is selectively transmitted by any portion of LC selectable bandpass filter 200 can be focused by lens 315 to PD 320 for collection of spectral data. For example, during a first time period, LC selectable bandpass filter 200 can be controlled such that only a first portion of LC selectable bandpass filter 200 (e.g., a first filter of optical filter array 205 and an associated first LC region of LC panel 210) transmits light in a first wavelength range. Lens 315 focuses a portion of the light in the first wavelength range (e.g., a portion that is incident on LC selectable bandpass filter 200 and lens 315 at normal incidence) to a focal point on a focal plane of lens 315, while other portions of the light (e.g., portions of light, incident on LC selectable bandpass filter 200 and lens 315 at other angles) are focused to other focal points on the focal plane. Here, PD 320 may be positioned at the focal point, may receive the portion of the light in the first wavelength range, and may collect spectral data, accordingly. Continuing with this example, during a second (e.g., subsequent) time period, LC selectable bandpass filter 200 can be controlled such that only a second portion of LC selectable bandpass filter 200 (e.g., a second filter of optical filter array 205 and an associated second LC region of LC panel 210) transmits light in a second wavelength range. In a similar manner as described above, lens 315 focuses a portion of the light in the second wavelength range (e.g., a portion that is incident on LC selectable bandpass filter 200 and lens 315 at normal incidence) to the focal point at which PD 320 is positioned. Thus, PD 320 may receive the portion of the light in the second wavelength range, and may collect spectral data, accordingly. In this way, a single PD 320 may collect spectral data associated with different wavelengths.

Notably, multispectral sensor device 300 need not include collection optics to collimate light prior to entering LC selectable bandpass filter 200 since the use of LC selectable bandpass filter 200, lens 315, and a single PD 320 (positioned at a particular focal point) provides control over a cone angle of light received by PD 320 (e.g., by controlling the acceptance area at the focal plane).

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components.

In some implementations, rather than including a single PD 320, a multispectral device may include an array of PDs 320. A known feature of a bandpass filter, such as those included in optical filter array 205, is the angle-shifting property—that is a peak transmission wavelength decreases as an angle of incidence increases. As described above, the Fourier Transform property of a focusing lens maps incident angle to a point on the focal plane. As a result, different points on the focal plane correspond to different wavelengths transmitted by a given filter of optical filter array 205. By including an array of PDs 320, the different wavelengths transmitted through the given filter of optical filter array 205 can be recorded for higher spectral resolution. Thus, in some implementations, a multispectral sensor device may include an array of PDs 320 (e.g., a 1D array or a 2D array) in order to provide high spectral resolution. In some implementations, each PD 320 of the array of PDs 320 may be positioned at a different focal point, of a set of focal points, to which lens 315 focuses light.

In some implementations, in addition to LC selectable bandpass filter 200 and at least one PD 320, a multispectral device may include a LC lens. A LC lens is a lens, comprising LC material that can be (partially) energized by an electrical signal in order to rearrange LC molecules of the LC lens (e.g., in a similar manner as described in association with LC panel 210). Unlike a conventional lens in which every point on the lens has the same focal point, the LC lens has the capability of varying a focal point with position on the LC lens. Thus, based on electrical signals applied to different regions of the LC lens, the LC lens can redirect light in different directions at different times.

Figure 5:
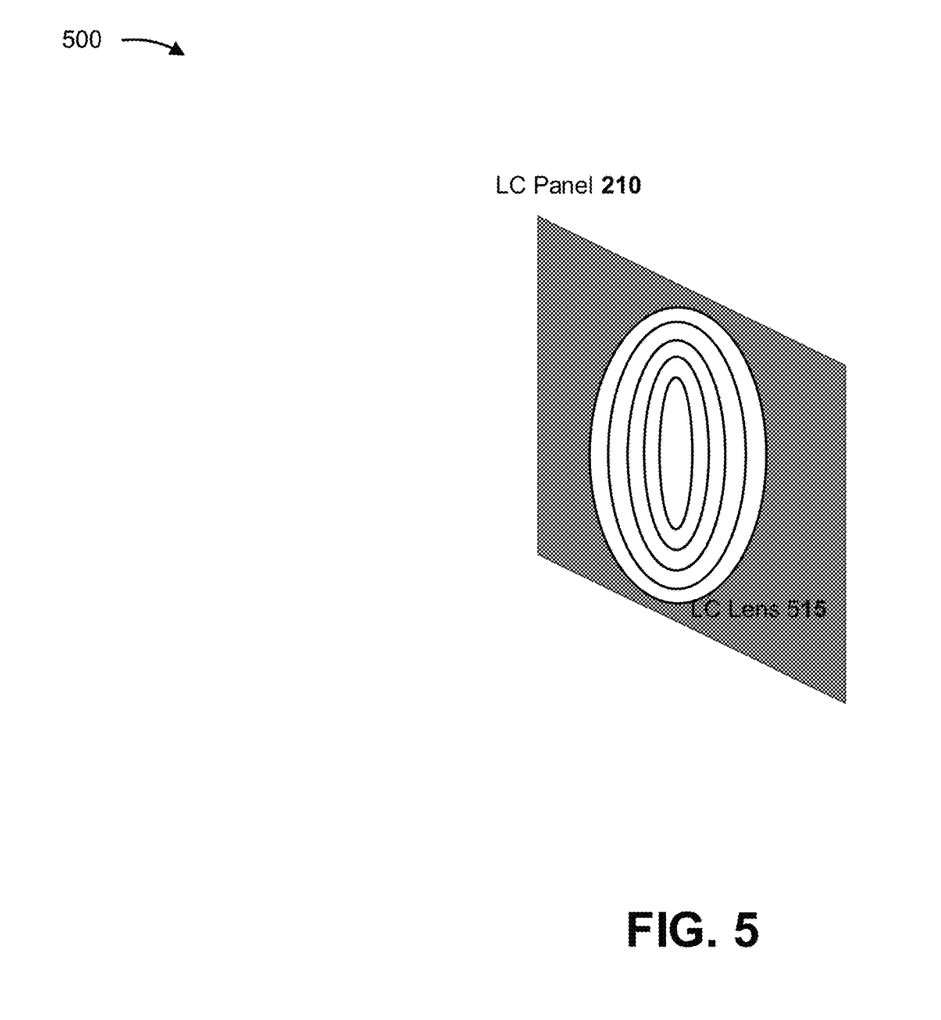
FIG. 5 is a diagram of an example LC panel.

In other words, in operation, LC molecules of a given region of the LC lens may provide a light steering capability. For example, a first region of the LC lens can direct light transmitted by a particular LC region of LC selectable bandpass filter 200 to the set of focal points, while a second region of the LC lens can direct other light, transmitted by other LC regions of LC selectable bandpass filter 200, away from the set of focal points. Thus, in some implementations, an LC lens can be used in a multispectral sensor device in order to enhance contrast in LC selectable bandpass filter 200 by directing light leaked from the blocking state channels away from the focal point of the light transmitted through a transmitting state channel. In some implementations, as shown in FIG. 5, the LC lens (e.g., LC lens 515) can be included in (e.g., integrated in) LC panel 210. Additionally, or alternatively, the LC lens may be a discrete component (e.g., separate from LC panel 210).

Figure 4:
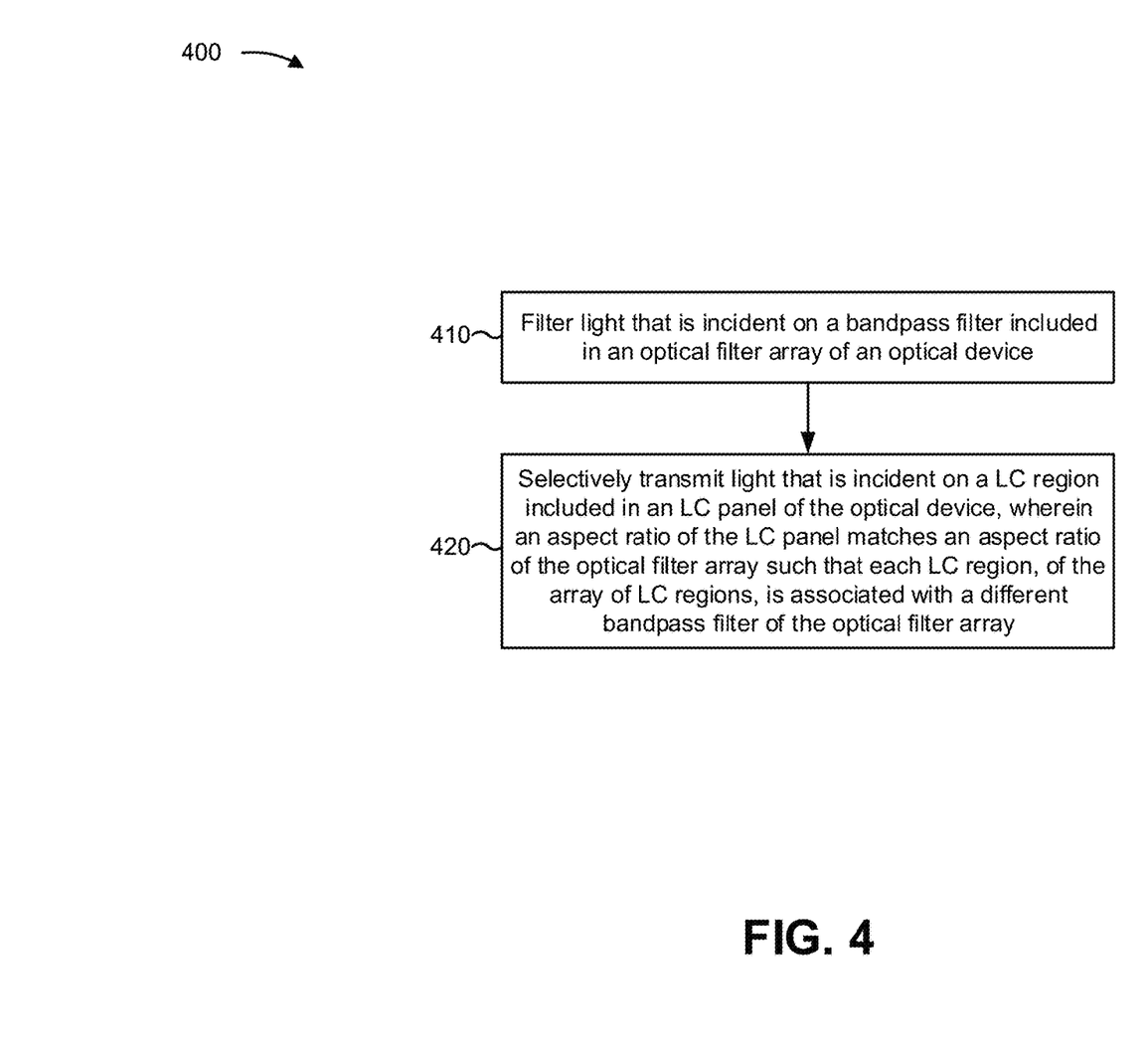
FIG. 4 is a flow chart of an example process for filtering and selectively transmitting portions of light incident on LC selectable bandpass filter.

FIG. 4 is a flow chart of an example process 400 for filtering and selectively transmitting portions of light incident on LC selectable bandpass filter 200. In some implementations, one or more process blocks of FIG. 4 may be performed by LC selectable bandpass filter 200.

As shown in FIG. 4, process 400 may include filtering light that is incident on a bandpass filter (block 410). For example, LC selectable bandpass filter 200 (e.g., one or more optical filters of optical filter array 205) may filter light that is incident on LC selectable bandpass filter 200, as described above.

As further shown in FIG. 4, process 400 may include selectively transmitting light that is incident on a LC region included in a LC panel, wherein an aspect ratio of the LC panel matches an aspect ratio of an optical filter array such that each LC region, of the LC panel, is associated with a respective bandpass filter of the optical filter array (block 420). For example, LC selectable bandpass filter 200 (e.g., one or more LC regions of LC panel 210) may selectively transmit light that is incident on a LC region included in LC panel 210, wherein an aspect ratio of LC panel 210 matches an aspect ratio of optical filter array 205 such that each LC region, of LC panel 210, is associated with a respective bandpass filter of optical filter array 205, as described above.

Process 400 may include additional implementations, such as any single implementations or any combination of implementations described below and/or described herein.

In some implementations, light that is transmitted by the LC region may be focused (e.g., by lens 315) to a set of focal points on a focal plane, wherein a portion of the light that is transmitted by the LC region is focused to a particular focal point of the set of focal points. Here, the portion of the light that is focused to the particular focal point may be received by a single photodiode (e.g., PD 320). In some aspects, the portion of the light that is focused to the particular focal point is incident on lens 315 at normal incidence.

In some implementations, light that is transmitted by the LC region may be focused (e.g., by lens 315) to a set of focal points on a focal plane. Here, portions of the light that are focused to the set of focal points may be received by photodetectors of a photodetector array (e.g., an array of PDs 320).

In some implementations, optical filter array 205 and LC panel 210 are arranged such that the light that is incident on the LC region has passed through the bandpass filter.

In some implementations, optical filter array 205 and LC panel 210 are arranged such that the light that is incident on the LC region is selectively transmitted to the bandpass filter.

In some implementations, a LC lens may direct light that is transmitted by the LC region to a set of focal points, and may direct other light, transmitted by other LC regions, away from the set of focal points.

In some implementations, LC panel 210 may be a twisted-nematic (TN) LC panel, a vertical alignment (VA) LC panel, or an in-plane switching (IPS) LC panel.

In some implementations, LC selectable bandpass filter 200 may be included in an optical device, such as a multispectral sensor device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a LC selectable bandpass filter that enables rapid optical filter switching with no moving parts, where optical filter switching is controlled electronically. In some implementations, the LC selectable bandpass filter can be used to create a multispectral sensor that uses a single photodiode thereby reducing complexity and/or cost of a multispectral sensor (e.g., as compared to a multispectral sensor device including a 1D or 2D array of photodiodes), while also improving performance of the multispectral sensor device. Further, in some implementations, the LC selectable bandpass filter may allow for higher spectral resolution measurements when a 1D or 2D array of photodiodes is used.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
    an optical filter array comprising an array of bandpass filters; and
    a liquid-crystal (LC) panel comprising an array of LC regions,
        wherein an aspect ratio of the LC panel matches an aspect ratio of the optical filter array such that each LC region, of the array of LC regions, is associated with a respective bandpass filter of the array of bandpass filters,
        wherein first light is transmitted by a first LC region, of the array of LC regions, based on a first electrical signal applied to the first LC region,
        wherein second light is transmitted by a second LC region, of the array of LC regions, based on a second electrical signal applied to the second LC region,
        wherein the first light is incident on the first LC region,
        wherein an LC lens is integrated in the LC panel,
        wherein a first region of the LC lens is arranged to direct the first light transmitted by the first LC region to one or more focal points, and
        wherein a second region of the LC lens is arranged to direct other light transmitted by one or more other LC regions, of the array of LC regions, away from the one or more focal points.

2. The optical device of claim 1,
    wherein the optical filter array and the LC panel are arranged such that the first light that is incident on the first LC region has passed through the first LC region.

3. The optical device of claim 1, wherein the optical filter array and the LC panel are arranged such that the first light that is incident on the first LC region is selectively transmitted to a particular bandpass filter of the array of bandpass filters.

4. The optical device of claim 1, further comprising:
    a single photodiode arranged at a focal point of the one or more focal points.

5. The optical device of claim 4, wherein a portion of the first light that is transmitted by the first LC region that is focused to the focal point is incident on the LC lens at normal incidence.

6. The optical device of claim 1, further comprising:
    a detector array comprising a plurality of photodetectors,
        wherein each photodetector, of the plurality of photodetectors, is arranged at a different focal point of the one or more focal points.

7. The optical device of claim 1, wherein the LC lens is included in the first LC region.

8. The optical device of claim 1, wherein the LC panel is one of a twisted-nematic (TN) LC panel, a vertical alignment (VA) LC panel, or an in-plane switching (IPS) LC panel.

9. The optical device of claim 1, wherein the optical device is a multispectral sensor device.

10. The optical device of claim 1, wherein the LC lens includes material that is partially energized by electrical signals.

11. The optical device of claim 1, wherein the one or more focal points vary at different times.

12. The optical device of claim 1, wherein the LC lens redirects in different directions at different times.

13. The optical device of claim 1,
wherein the first light is light transmitted through a transmitting state channel, and
wherein the other light is light leaked from blocking state channels.

14. An optical device, comprising:
an array of optical filters; and
a liquid-crystal (LC) panel comprising an array of LC regions,
wherein first light is incident on a first LC region of the array of LC regions,
wherein the first LC region is associated with a first optical filter of the array of optical filters,
wherein the first light is transmitted by the first LC region based on a first electrical signal applied to the first LC region,
wherein second light is incident on a second LC region of the array of LC regions,
wherein the second LC region is associated with a second optical filter of the array of optical filters,
wherein the second light is transmitted by the second LC region based on a second electrical signal applied to the second LC region,
wherein an LC lens is integrated in the LC panel,
wherein a first region of the LC lens is arranged to direct the first light transmitted by the first LC region to one or more focal points, and
wherein a second region of the LC lens is arranged to direct other light transmitted by one or more other LC regions, of the array of LC regions, away from the one or more focal points.

15. The optical device of claim 14, wherein the array of optical filters and the LC panel are arranged such that the first light that is incident on the first LC region has passed through the first optical filter and such that the second light that is incident on the second LC region has passed through the second optical filter.

16. The optical device of claim 14, wherein the array of optical filters and the LC panel are arranged such that the first light that is incident on the first LC region is selectively transmitted to the first optical filter and the second light that is incident on the second LC region is selectively transmitted to the second optical filter.

17. The optical device of claim 14, further comprising:
a single photodiode arranged at a focal point of the one or more focal points.

18. The optical device of claim 14, further comprising:
a detector array comprising a plurality of photodetectors,
wherein each photodetector, of the plurality of photodetectors, is arranged at a different focal point of the one or more focal points.

19. A method, comprising:
transmitting, by a first liquid-crystal (LC) region included in a LC panel of an optical device and based on a first electrical signal applied to the first LC region, first light that is incident on the first LC region;
transmitting, by a second LC region included in the LC panel and based on a second electrical signal applied to the second LC region, second light that is incident on the second LC region,
wherein an aspect ratio of the LC panel matches an aspect ratio of an optical filter array included in the optical device such that each LC region, of the LC panel, is associated with a respective bandpass filter of the optical filter array;
directing, by a first region of an LC lens integrated in the LC panel, the first light transmitted by the first LC region to one or more focal points; and
directing, by a second region of the LC lens, other light transmitted by one or more other LC regions, included in the LC panel, away from the one or more focal points.

20. The method of claim 19, further comprising:
receiving, by a single photodiode included in the optical device, the first light that is focused to a particular focal point of the one or more focal points.

* * * * *